June 3, 1941.  H. BENDER  2,244,324
PROCESS FOR THE PRODUCTION OF AN ALKYL BROMIDE
Filed Dec. 6, 1939
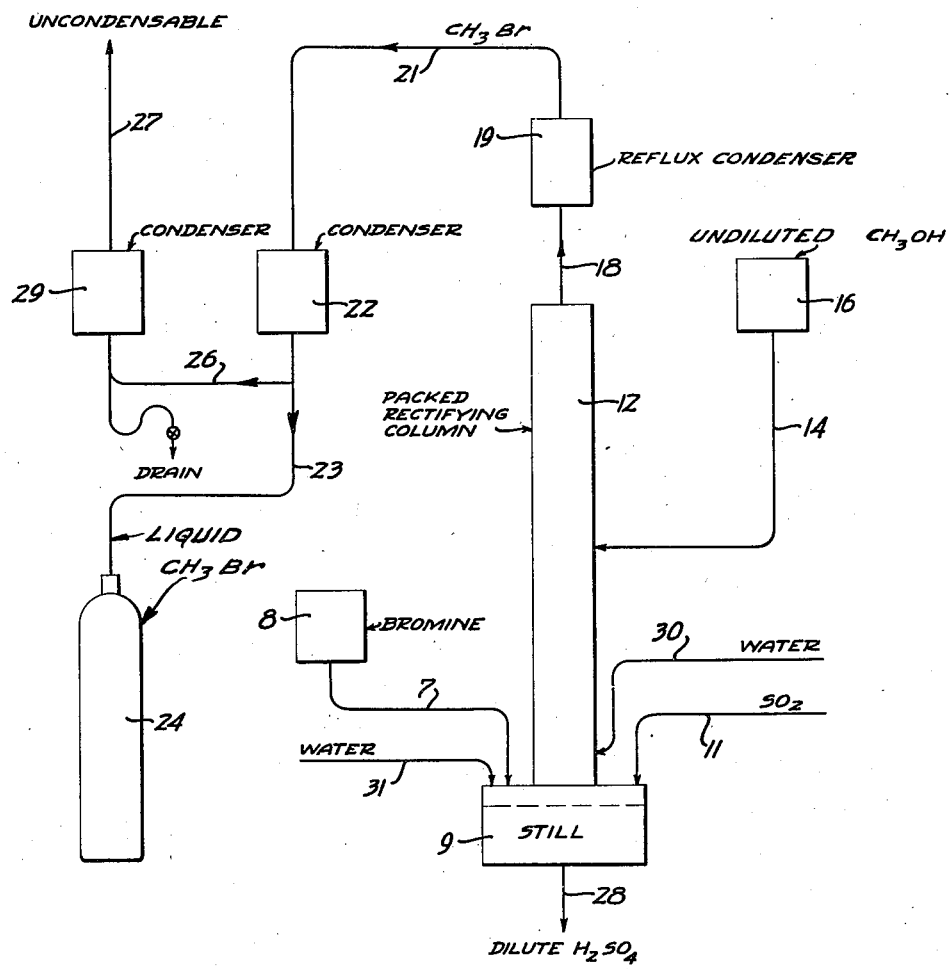
INVENTOR
HARRY BENDER
BY
Robert N. Eckhoff,
ATTORNEY Patented June 3, 1941

2,244,324

UNITED STATES PATENT OFFICE 2,244,324

PROCESS FOR THE PRODUCTION OF AN ALKYL BROMIDE

Harry Bender, Antioch, Calif., assignor to The Dow Chemical Company, Midland, Mich., a corporation of Michigan Application December 6, 1939, Serial No. 307,798

5 Claims. (Cl. 260—657)

In application Serial Number 152,085, filed July 6, 1937, now Patent Number 2,173,133, of September 19, 1939, a process for the manufacture of alkyl bromides from various saturated aliphatic alcohols is disclosed. The present invention relates to an improved process for the manufacture of the bromides of these alcohols, particularly methyl bromide. To simplify discussion, the manufacture of methyl bromide will be referred to hereinafter in detail, but it is to be understood that the invention is equally applicable to the manufacture of the bromides of other aliphatic alcohols.

In the aforementioned application it was proposed to add bromine and sulfur dioxide to a heated still. The liquid body in the still was vaporized and passed upwardly into a packed rectifying column from which was finally removed liquified methyl bromide. Methyl alcohol diluted with water was added to supply a portion of the reflux stream in the column. A feature of that invention was that water be added to the reacting mixture in an amount such that sulfuric acid formed and removed from the process was diluted to an extent such that it was not effective as a sulfating agent on the alcohol, otherwise undesirable side reactions took place, resulting in the formation of ether and other sulfation products. I have discovered that by adding the alcohol in an undiluted form, and adding the water, as such, to the still, better operation is insured. For example, sulfur dioxide is much more soluble in concentrated methyl alcohol than in water or dilute methyl alcohol. Consequently, if any sulfur dioxide, as such, tends to pass up the rectifying column it goes into solution in the alcohol. The same is true of hydrobromic acid. In a sense, the descending stream of undiluted alcohol assures that only methyl bromide passes up the column beyond the point of introduction of the alcohol. Fundamentally the reaction is between the alcohol and hydrobromic acid. Consequently, with sulfur dioxide being more soluble in the alcohol than in water, and with hydrobromic acid reacting directly with the alcohol, the increase in alcohol concentration in the column is effective to provide a purer methyl bromide product passing over as the resulting product from the reaction.

A further advantage in the use of concentrated alcohol and addition of the water as such to the region whereat the hydrobromic acid is formed is that the formation of a methyl bromide hydrate is obviated. This hydrate forms when methyl bromide is in the presence of water. It freezes out with methyl bromide and is apt to clog or stop up a condenser or heat exchanger. This hydrate is alcohol soluble; the concentrated alcohol dissolves any hydrate which forms, thus preventing any trouble therefrom.

The water can be added to the still to which the bromine and $SO_2$ are added, or at a point well below that of alcohol addition in the fractionating and reflux column on the still, or a portion of the water required can be added to the still and another portion to the column. In any event, the alcohol used should be relatively undiluted and the bulk of the water required for acid dilution should be separately added.

In the drawing accompanying and forming a part hereof I have indicated diagrammatically a suitable apparatus for practicing the invention. As appears therein, I provide a still 9 connected to a packed rectifying column 12 and which in turn is connected to condenser 19 to return a reflux stream through line 18 to the rectifying column.

Bromine is introduced through line 7 from a suitable source indicated at 8. Sulfur dioxide is introduced through line 11, concentrated alcohol, in this instance methyl alcohol, is introduced from container 16 through line 14 at a point in the rectifying column. Water is either introduced directly into the column at the bottom thereof through line 30, or into the still pot through line 31, or at both places. Dilute sulfuric acid is removed from the still through line 28.

The gas withdrawn from the reflux condenser 19 is substantially entirely methyl bromide. It is drawn off through line 21 into a condenser 22 wherein the methyl bromide is condensed and is run off through line 23 into a suitable receptacle such as a steel drum 24. The uncondensed gas fraction is separated and is withdrawn through line 26 to pass through a condenser 29, the uncondensed gas remaining being passed to the atmosphere through line 27.

In operation, the still is suitably heated, the bromine, sulfur dioxide and water reacting therein to form hydrogen bromide which passes up the column.

The alcohol employed is relatively concentrated, that is, it contains so little water that the water introduced with the alcohol, if any, is insignificant and water must be separately added to insure the proper dilution of the sulfuric acid produced in the process.

I claim:

1. A process for production of methyl bromide comprising heating a mixture of bromine, sulfur dioxide and water to boiling to form hydrobromic acid vapor, passing said vapor into contact with substantially undiluted methyl alcohol to react therewith and form methyl bromide and water, and distilling off the methyl bromide.

2. A process for production of methyl bromide comprising heating a mixture of bromine, sulfur dioxide and water to boiling under reflux to form hydrobromic acid as a portion of the reflux stream, introducing substantially undiluted methyl alcohol into said reflux stream to react with hydrobromic acid therein, and distilling methyl bromide off said reflux stream.

3. A process for production of methyl bromide comprising heating a mixture of bromine, sulfur dioxide and water to boiling under reflux to form hydrobromic acid as a portion of a reflux stream and introducing substantially undiluted methyl alcohol into said reflux stream to react with hydrobromic acid therein.

4. A process for manufacture of methyl bromide comprising maintaining a body of water, bromine and sulfur dioxide at a temperature sufficient to distill off a vapor stream, cooling said stream and adding substantially undiluted methyl alcohol to said stream to provide a partial reflux returning to said body while removing methyl bromide from the vapor stream, and introducing bromine, water, and sulfur dioxide into said reaction by direct introduction into said body to maintain the required reacting proportions thereof in said body.

5. A process for manufacture of an alkyl bromide comprising maintaining a body of water, bromine and sulfur dioxide at a temperature sufficient to distill off a vapor stream, cooling said stream and adding a substantially undiluted saturated aliphatic alcohol to said stream to provide a partial reflux returning to said body while removing the alkyl bromide from the vapor stream, and introducing bromine, water, and sulfur dioxide into said reaction by direct introduction into said body to maintain the required reacting proportions thereof in said body.

HARRY BENDER.